(12) United States Patent
Morgan et al.

(10) Patent No.: US 6,398,832 B2
(45) Date of Patent: *Jun. 4, 2002

(54) HIGH FLOW CAPACITY FILTER

(75) Inventors: Jeffrey S. Morgan, Stoughton; Jon S. Wake, Verona; Kent J. Kallsen, Madison, all of WI (US)

(73) Assignee: Nelson Industries, Inc., Stoughton, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/904,934

(22) Filed: Jul. 13, 2001

Related U.S. Application Data

(63) Continuation of application No. 09/527,792, filed on Mar. 27, 2000, now Pat. No. 6,261,334, which is a continuation-in-part of application No. 09/240,714, filed on Jan. 29, 1999, now Pat. No. 6,149,700.

(51) Int. Cl.[7] .............................................. B01D 46/02
(52) U.S. Cl. ......................... 55/385.3; 55/498; 55/502; 55/510; 55/514; 123/198 E
(58) Field of Search ............................ 55/385.1, 385.3, 55/498, 502, 510, 514, DIG. 28, DIG. 30; 123/198 E

(56) References Cited

U.S. PATENT DOCUMENTS

| | | |
|---|---|---|
| 2,599,604 A | 6/1952 | Bauer |
| 2,962,121 A | 11/1960 | Wilber |
| 3,147,100 A | 9/1964 | Wilber |
| 3,160,488 A | 12/1964 | Wilber |
| 3,334,753 A | 8/1967 | Royer |
| 4,065,341 A | 12/1977 | Cub |
| 4,310,419 A | 1/1982 | Nara |
| 4,589,983 A | 5/1986 | Wydevan |
| 4,634,527 A | 1/1987 | Marshall |
| 4,720,292 A | 1/1988 | Engel |
| 4,759,783 A | 7/1988 | Machado |
| 5,106,397 A | 4/1992 | Jaroszczyk |
| 5,167,683 A | 12/1992 | Berhrendt et al. |
| 5,275,636 A | 1/1994 | Dudley et al. |
| 5,415,677 A | 5/1995 | Ager et al. |
| 5,431,706 A * | 7/1995 | Paas .......................... 55/502 |
| 5,484,466 A | 1/1996 | Brown et al. |

(List continued on next page.)

FOREIGN PATENT DOCUMENTS

| | | |
|---|---|---|
| DE | 3001674 | 7/1981 |
| DE | 3405719 | 8/1985 |
| EP | 664389 | 7/1995 |
| FR | 1131647 | 10/1956 |
| FR | 2261041 | 12/1975 |
| GB | 1499922 | 2/1978 |
| GB | 2110110 | 6/1983 |
| WO | 95/19832 | 7/1995 |

*Primary Examiner*—David A. Simmons
*Assistant Examiner*—Minh-Chau T. Pham
(74) *Attorney, Agent, or Firm*—Andreas, Sceales, Starke & Sawall, LLP

(57) ABSTRACT

A filter element (202, 250) includes pleated filter media (26) having a plurality of pleats (28) in a closed annular loop having an outer perimeter (30) defined by a plurality of outer pleat tips (32), an inner perimeter (34) defined by a plurality of inner pleat tips (36), the loop having a hollow interior (38) extending along an axis (40), wherein fluid to be filtered flows laterally through the filter media and flows axially in the hollow interior (38). The filter element has an axial flow passage (56a) along the axis (40) and circumscribing the hollow interior (38) and has a flow perimeter (218) greater than the inner perimeter (34) of the filter element defined by the inner pleat tips (36), and in the preferred embodiment substantially the same as the outer perimeter (30) defined by the outer pleat tips (32), to provide axial flow (58) through the hollow interior (38) and additional axial flow (59 and 59a) through the axial ends (68) of the pleats.

34 Claims, 6 Drawing Sheets

U.S. PATENT DOCUMENTS

| | | |
|---|---|---|
| 5,487,767 A | 1/1996 | Brown |
| 5,547,480 A | 8/1996 | Coulonvaux |
| 5,556,440 A | 9/1996 | Mullins et al. |
| 5,562,825 A | 10/1996 | Yamada |
| 5,601,626 A | 2/1997 | Hori et al. |
| 5,601,717 A | 2/1997 | Villette et al. |
| 5,605,555 A | 2/1997 | Patel et al. |
| 5,605,625 A | 2/1997 | Mills |
| 5,632,791 A | 5/1997 | Oussoren et al. |
| 5,669,949 A | 9/1997 | Dudrey et al. |
| 5,674,393 A | 10/1997 | Terhune |
| 5,685,985 A | 11/1997 | Brown et al. |
| 5,693,109 A | 12/1997 | Coulonvaus |
| 5,725,624 A | 3/1998 | Ernst et al. |
| 5,730,769 A * | 3/1998 | Dungs et al. ................. 55/502 |
| 5,741,421 A | 4/1998 | Erdmannsdoerfer |
| 5,755,842 A * | 5/1998 | Patel et al. .................... 55/510 |
| 5,755,843 A * | 5/1998 | Sundquist .................. 55/385.3 |
| 5,797,973 A | 8/1998 | Dudrey et al. |
| 5,800,581 A * | 9/1998 | Gielink et al. ................. 55/498 |
| 5,863,313 A | 1/1999 | Coulonvaux |
| 5,885,314 A | 3/1999 | Oussoren et al. |
| 5,893,937 A * | 4/1999 | Moessinger ............ 55/DIG. 28 |
| 6,117,202 A | 9/2000 | Wetzel |
| 6,149,700 A * | 11/2000 | Morgan et al. ................. 55/498 |
| 6,187,240 B1 | 2/2001 | Coulonvaux |

* cited by examiner

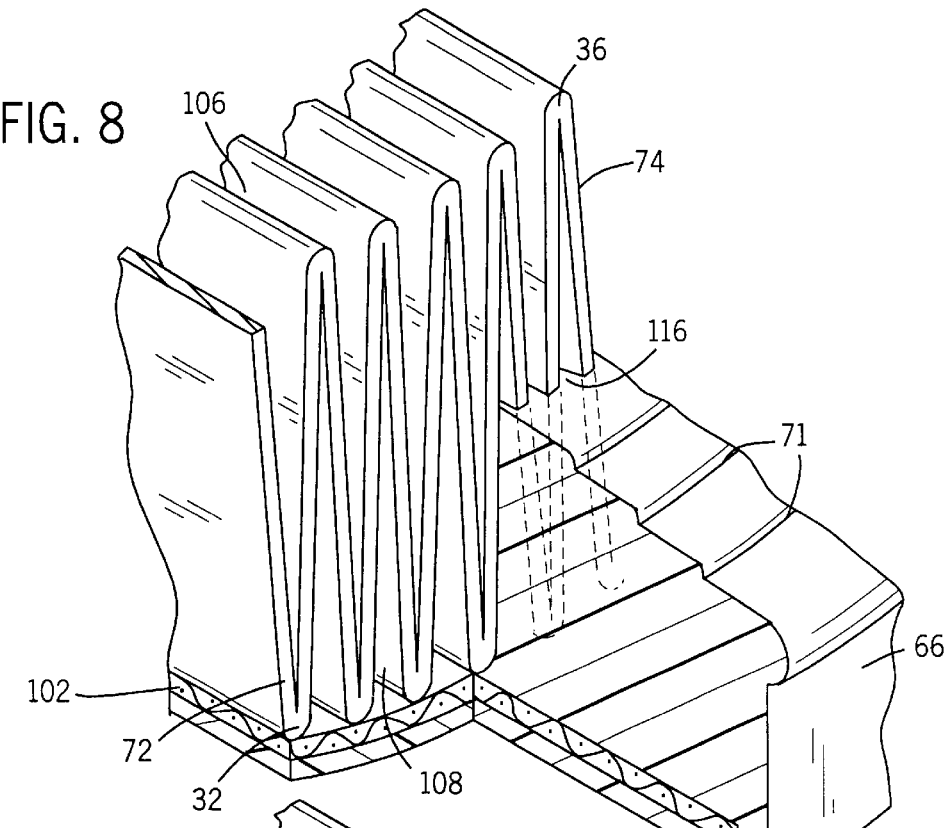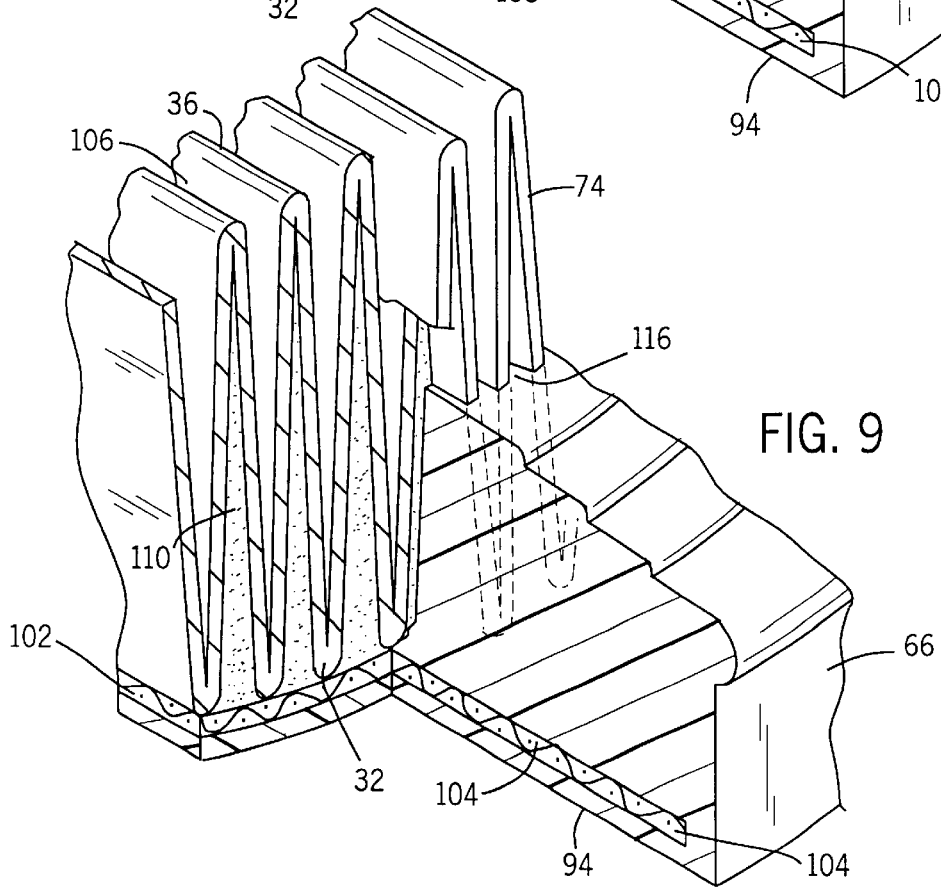

HIGH FLOW CAPACITY FILTER

CROSS-REFERENCE TO RELATED APPLICATION

This application is a continuation of U.S. application Ser. No. 09/527,792, filed Mar. 27, 2000, now U.S. Pat. Ser. No. 6,261,334 which continuation-in-part of U.S. Application Ser. No. 09/240,714, filed Jan. 29, 1999, now U.S. Pat. 6,149,700.

BACKGROUND AND SUMMARY

The invention relates to fluid filters, and more particularly to constructions maximizing flow capacity and minimizing restriction.

There is continuing demand for increased flow capacity in the same or even smaller size filters. This is particularly true in air cleaner designs for internal combustion engines, where engine compartment space is limited. A filter construction enabling higher capacity in the same or less space provides competitive advantage and a space efficient filter system.

A common air cleaner used in truck engines has a filter element provided by pleated filter media having a plurality of pleats in a closed loop configuration, typically annular, having an outer perimeter defined by a plurality of outer pleat tips, an inner perimeter defined by a plurality of inner pleat tips, and a hollow interior extending along an axis. The air typically flows laterally or radially inwardly through the filter media into the hollow interior and then axially outwardly through an outlet flow tube to the combustion air intake of the engine. The outlet tube has a diameter slightly smaller than the diameter of the hollow interior between the inner pleat tips. A first end cap covers the axial ends of the pleats at one axial end of the filter element and forms a radial seal with the outlet tube extending therethrough partially into the hollow interior. Additionally or alternatively, the end cap forms an axial seal with the housing containing the filter element. The end cap is a resilient compressible material, to aid in forming the noted seals. The radial seal is formed by radially compressing the end cap material between the outlet tube and the inner pleat tips or an inner liner extending therealong. The axial seal is formed by axially compressing the end cap material between the axial ends of the pleats and the axial end of the housing containing the filter element. A second end cap covers the axial ends of the pleats at the other axial end of the filter element and may span the hollow interior to close same, or such hollow interior may be closed by a portion of the housing extending thereinto. The flow capacity of the filter is affected by various factors, including restrictions, such as the size of the outlet opening through the noted outlet tube at the axial end of the filter.

The invention of the noted parent application increases flow capacity by enabling enlargement of the outlet flow passage, to lower the noted restriction to flow. The increased outlet size of the filter element and lowered restriction is accomplished while still maintaining or even increasing the amount of filter media and while also staying within the same package or housing size. As noted above, in the prior art, the largest diameter outlet from the filter element is limited to approximately the size of the diameter of the hollow interior defined by the inner pleat tips. In the preferred embodiment of the parent invention, the end cap encloses only the outer edges of the axial ends of the pleats, and has an inner diameter larger than the diameter of the hollow interior defined by the inner pleat tips. The enlarged inner diameter of the end cap forms a radial seal with an enlarged outlet tube having a diameter greater than the diameter of the hollow interior defined by the inner pleat tips. A radial seal is formed between the enlarged diameter outlet tube and the enlarged inner diameter end cap at a location along the axial ends of the pleats between the inner pleat tips and the outer pleat tips. An outer liner circumscribes the filter element along the outer pleat tips and extends beyond the axial end thereof into the end cap and provides support for the noted radial seal, i.e. the end cap material is radially compressed between the outlet tube and the outer liner. The outlet flow passage from the filter element is now the inside diameter of the end cap rather than the diameter of the hollow interior defined by the inner pleat tips. Fluid passing through the filter media can now also travel axially between the pleats as well as axially through the hollow interior defined by the inner pleat tips. As a result of such construction, fluid flow restriction is reduced, and the radial depth of the pleat is no longer limited to a specific outlet tube diameter. Instead, the radial depth of the pleat can theoretically extend all the way to the axial center line of the filter, allowing maximization of filter media area within a given package or housing size. The parent invention may also be used for opposite direction flow filters, in which case enlargement of the inlet flow passage is enabled, to reduce inlet flow restriction.

The present invention further increases flow capacity by enabling further enlargement of the outlet flow passage, to further lower the noted restriction to flow. The further increased outlet size of the filter element and the further lowered restriction is accomplished while still maintaining or even increasing the amount of filter media and while also staying within the same package or housing size. In the present invention, the largest diameter outlet from the filter element is not limited to the size of the diameter of the hollow interior defined by the inner pleat tips, nor limited to the inner diameter of the end cap even if the latter is enlarged in accordance with the noted parent invention. The present invention enables the filter outlet to have a diameter substantially as large as the outer diameter of the filter element at the outer pleat tips. The invention may also be used for opposite direction flow filters, in which case maximized enlargement of the inlet flow passage is enabled, to minimize inlet flow restriction.

BRIEF DESCRIPTION OF THE DRAWINGS

Parent Invention

FIG. 8 is an enlarged view of a portion of the structure of FIG. 3, partially cut away.

FIG. 9 is a view like FIG. 8, with a further portion cut away.

Present Invention

Figure 2:
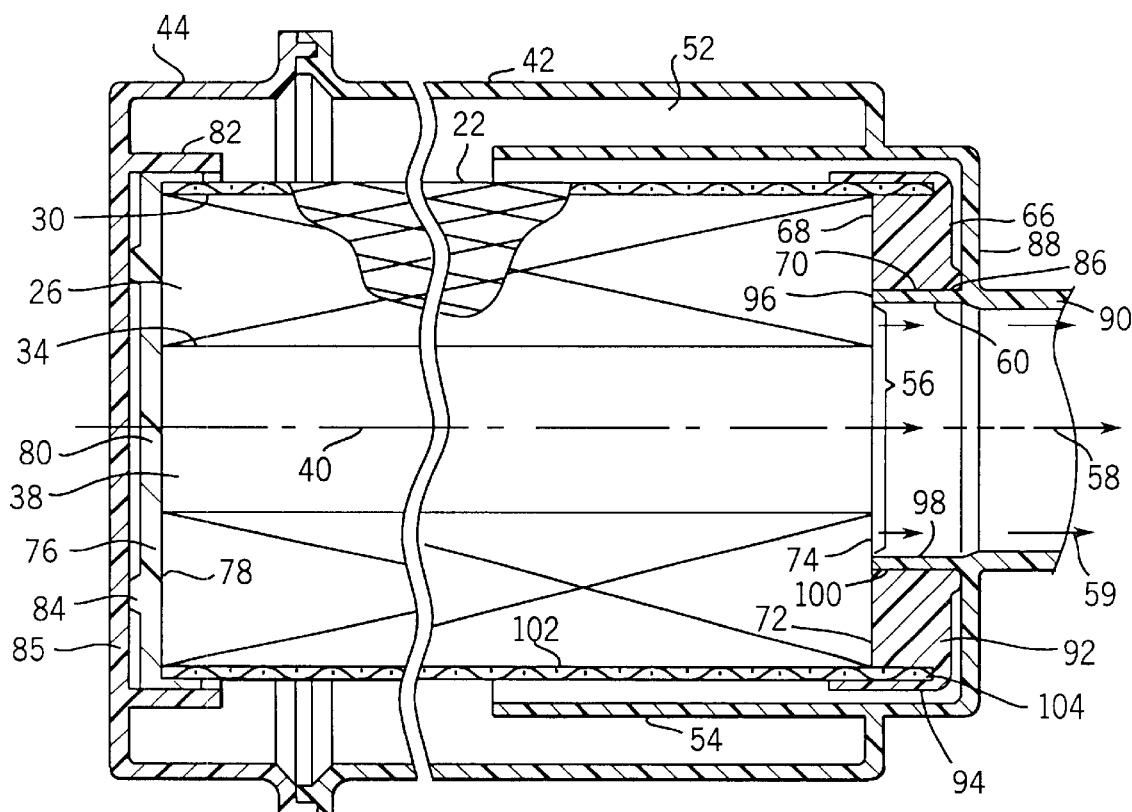
FIG. 2 is a sectional view taken along line 2—2 of FIG. 1.
Figure 12:
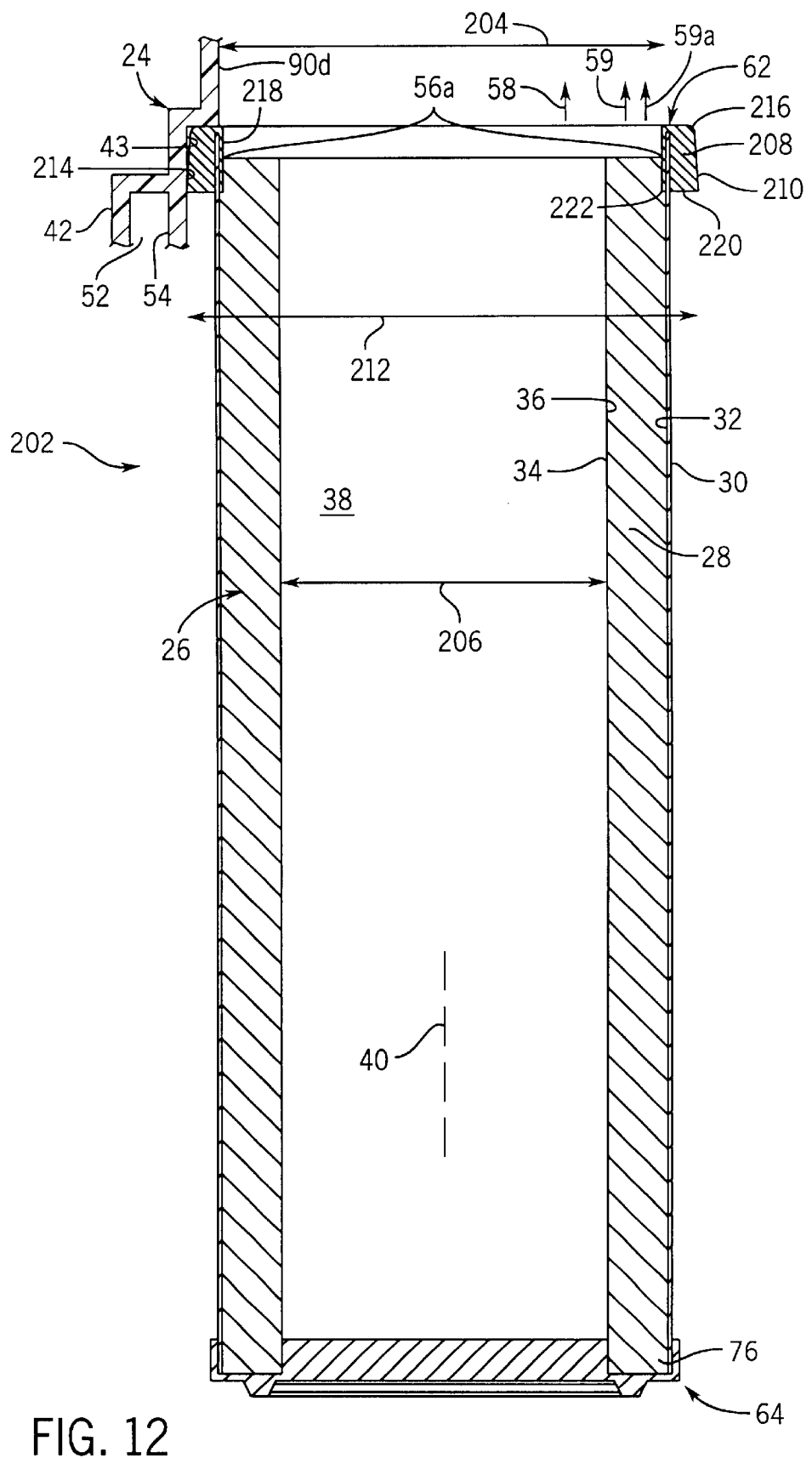

FIG. 12 is a sectional view similar to FIG. 2 but showing a filter element in accordance with the present invention.

Figure 11:
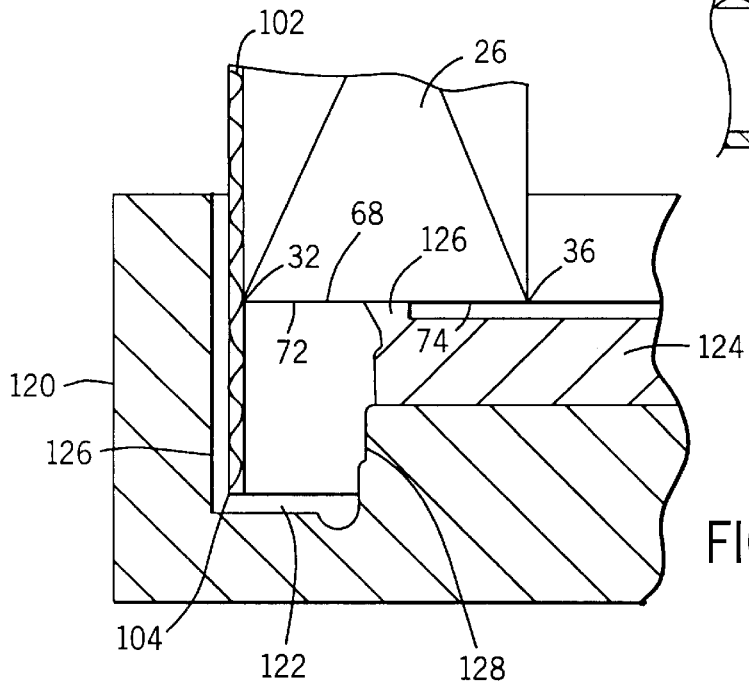
FIG. 11 shows a mold for molding or potting an end cap onto pleated filter media of the filter element.
Figure 13:
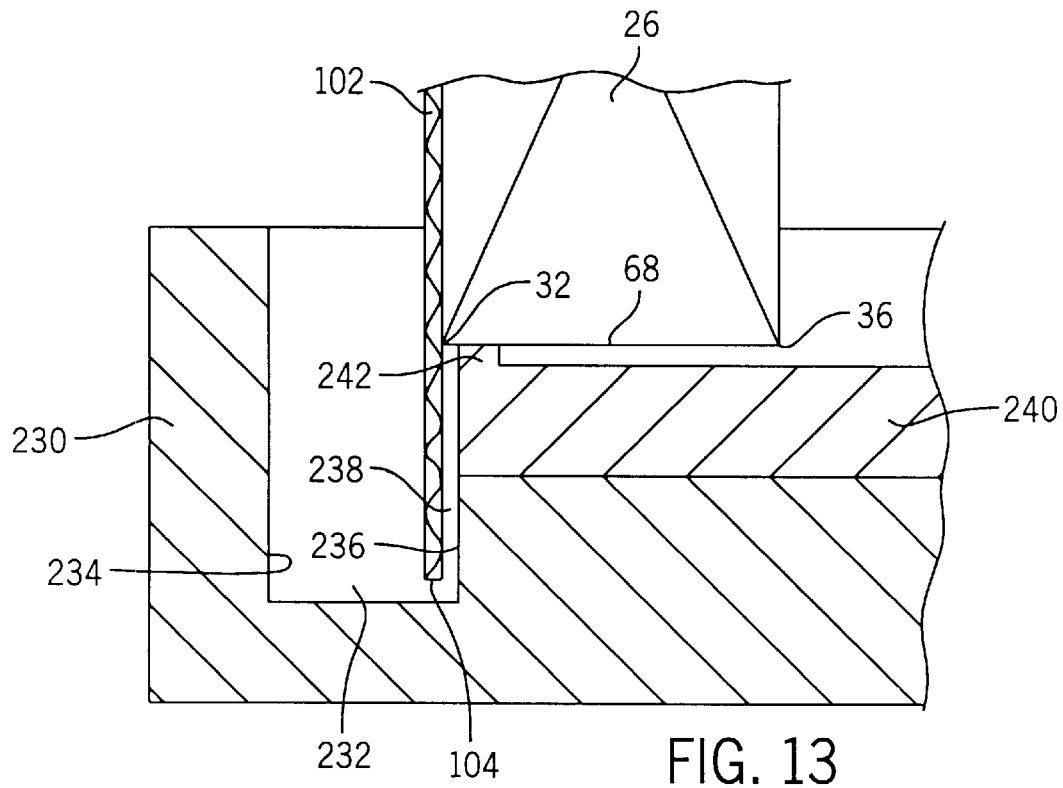

FIG. 13 is like FIG. 11 but shows a mold for molding or potting an end cap onto pleated filter media of the filter element of the present invention.

Figure 14:
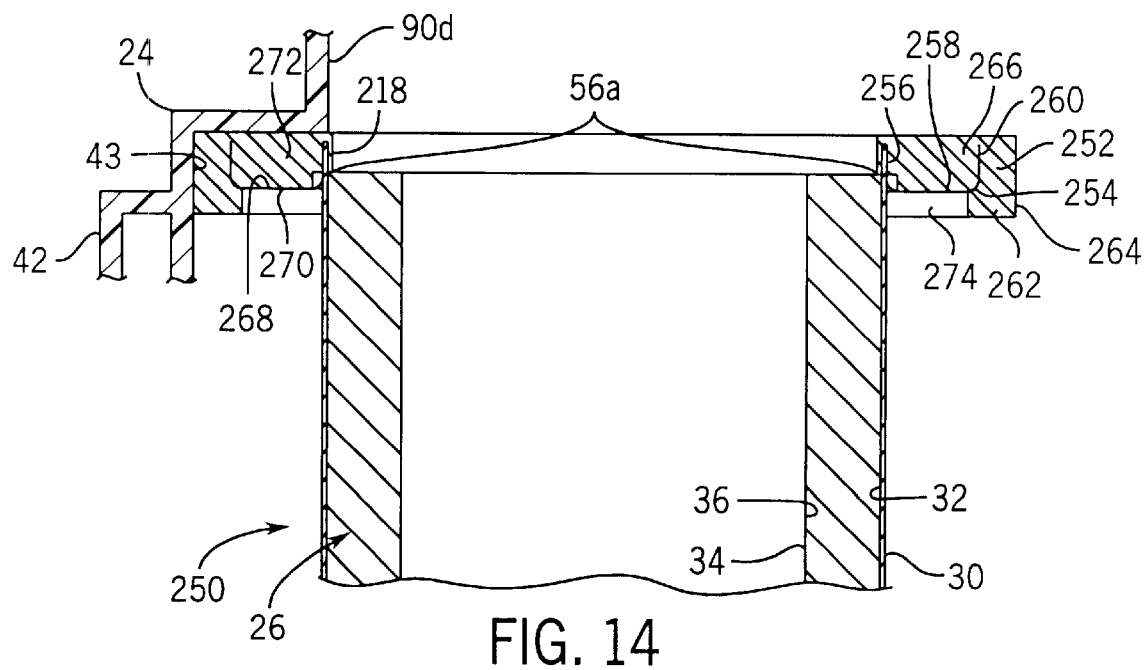

FIG. 14 is like FIG. 12 and shows another embodiment.

DETAILED DESCRIPTION

Parent Invention

Figure 1:
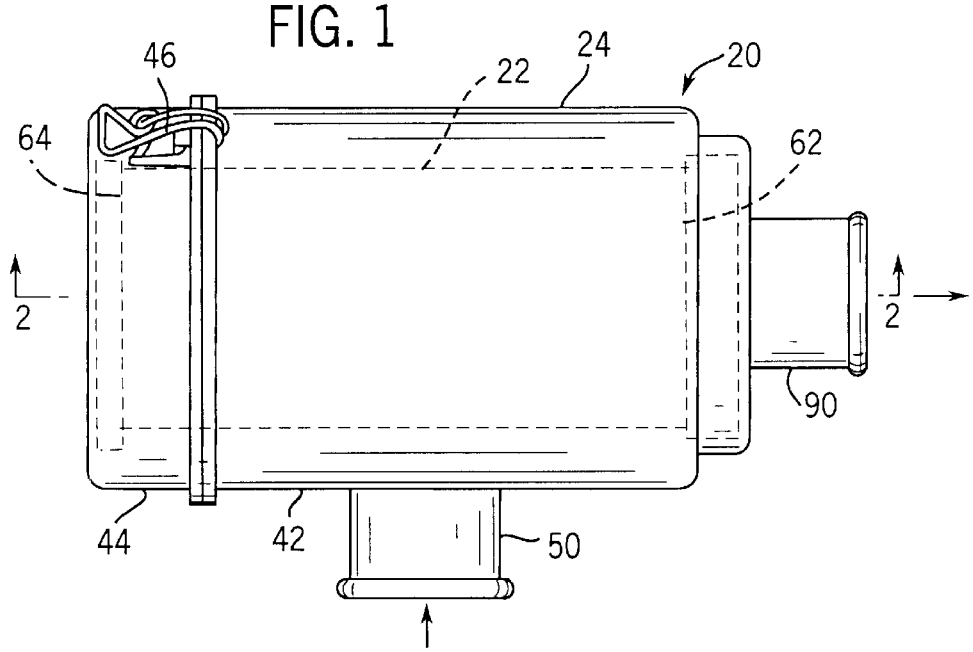
FIG. 1 is taken from the above noted parent U.S. application Ser. No. 09/240,714, filed Jan. 29, 1999, and is a side elevation view of a filter constructed in accordance with the parent invention.

FIGS. 1 and 2 show a filter 20 including a filter element 22 contained within a housing 24. Filter element 22 is provided by pleated filter media 26, FIG. 2, having a plurality of pleats 28, FIGS. 5–9, in a closed loop, typically an annulus, having an outer perimeter 30 defined by a plurality of outer pleat tips 32, and an inner perimeter 34 defined by a plurality of inner pleat tips 36. The annular closed loop has a hollow interior 38 extending along an axis 40. Housing 24 is typically cylindrical and is provided by housing sections 42 and 44 mounted to each other in conventional manner such as by overcenter spring clip type clamps such as 46, or in other suitable manner. The housing has an inlet 50 admitting inlet fluid, such as air or liquid, radially and/or tangentially into annular space 52 within the housing around filter element 22. The housing may include an interior dam or deflection surface 54 for blocking direct impact against filter element 22 and/or for directing flow, for example in a spiral or toroidal pattern. The fluid flows laterally or radially inwardly through filter media 26 into hollow interior 38, and then the clean fluid flows axially rightwardly in FIG. 2 in hollow interior 38 along flow passage 56 as shown at arrows 58, 59.

Flow passage 56 extending along axis 40 circumscribes hollow interior 38 and has a flow perimeter 60 greater than inner perimeter 34 defined by inner pleat tips 36, to be described. Flow perimeter 60 is less than outer perimeter 30 defined by outer pleat tips 32. Inner perimeter 34 defines and bounds a first cross-sectional area. Flow perimeter 60 defines and bounds a second cross-sectional area. The second cross-sectional area is greater than the first cross-sectional area. Outer perimeter 30 defines and bounds a third cross-sectional area. The second cross-sectional area is less than the third cross-sectional area.

Figure 3:
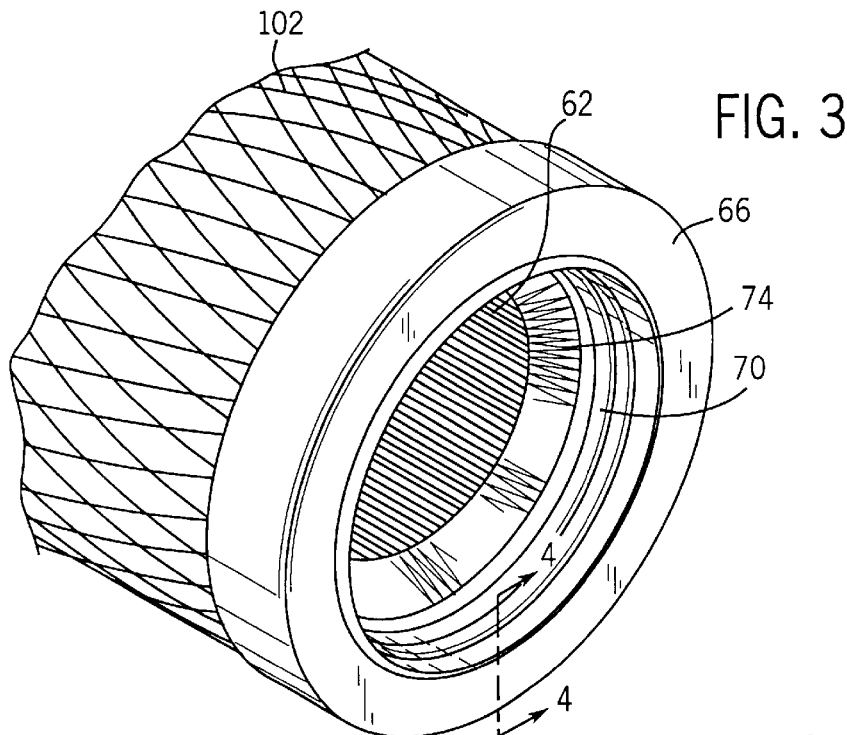
FIG. 3 is an isometric view of a portion of the filter element of FIG. 2.
Figure 5:
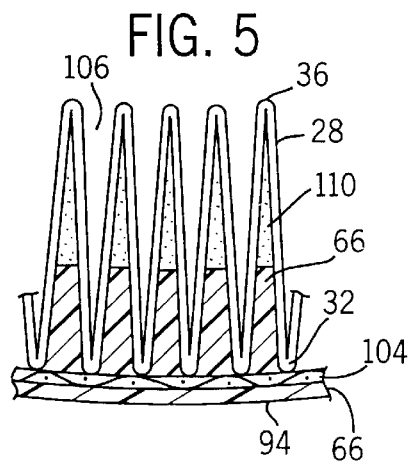
FIG. 5 is a sectional view taken along line 5—5 of FIG. 4.

Filter element 22 has first and second axial ends 62 and 64. Axial end 62 is open, FIG. 3, and provides axial flow passage 56 therethrough. An end cap 66 of soft resilient compressible material, such as foamed potted urethane, axially abuts the axial ends 68 of the pleats. End cap 66 has an inner perimeter 70, FIGS. 3 and 4, greater than inner perimeter 34 defined by inner pleat tips 36. End cap 66 partially covers the axial ends 68 of the pleats such that the laterally outward portions 72 of the axial ends of the pleats are covered by end cap 66 but not the laterally inward portions 74 of the axial ends of the pleats, such that the laterally inward portions 74 of the axial ends of the pleats are uncovered and exposed at axial end 62 of filter element 22, FIGS. 8 and 9. Second axial end 64 of filter element 22 is closed. A second end cap 76, FIG. 2, of soft compressible resilient material, such as foamed potted urethane, is provided at second end 64 of the filter element and completely covers the axial ends 78 of the pleats including the outer pleat tips and the inner pleat tips at axial end 64. End cap 76 also includes a central section 80 spanning and completely covering hollow interior 38 of filter element 22 at axial end 64 of the filter element. Housing section 44 includes an annular interior sidewall 82 extending partially axially into the housing to locate and retain filter element 22 at axial end 64. In other embodiments, central section 80 of end cap 76 is omitted, and a portion of housing section 44 extends into hollow interior 38 of filter element 22 to close axial end 64 of the filter element and to position axial end 64 of the filter element within the housing. End cap 76 includes an annular ridge 84 engaging axial endwall 85 of housing section 44 and slightly axially compressed thereagainst to further aid in retention of filter element 22 within the housing and to accommodate axial tolerances. End cap 66 also includes an annular ridge 86 engaging axial endwall 88 of housing section 42 and slightly radially compressed thereagainst to aid in retaining filter element 22 within the housing and to accommodate axial tolerances and also to provide an axial seal to prevent bypass of dirty air from annular chamber 52 around axial end 62 of the filter element. Axial endwall 88 of housing section 42 has an outlet flow tube 90 extending therethrough. In addition to or alternatively to the axial seal at 86, end cap 66 provides a radial seal against outlet flow tube 90, to be described.

Figure 4:
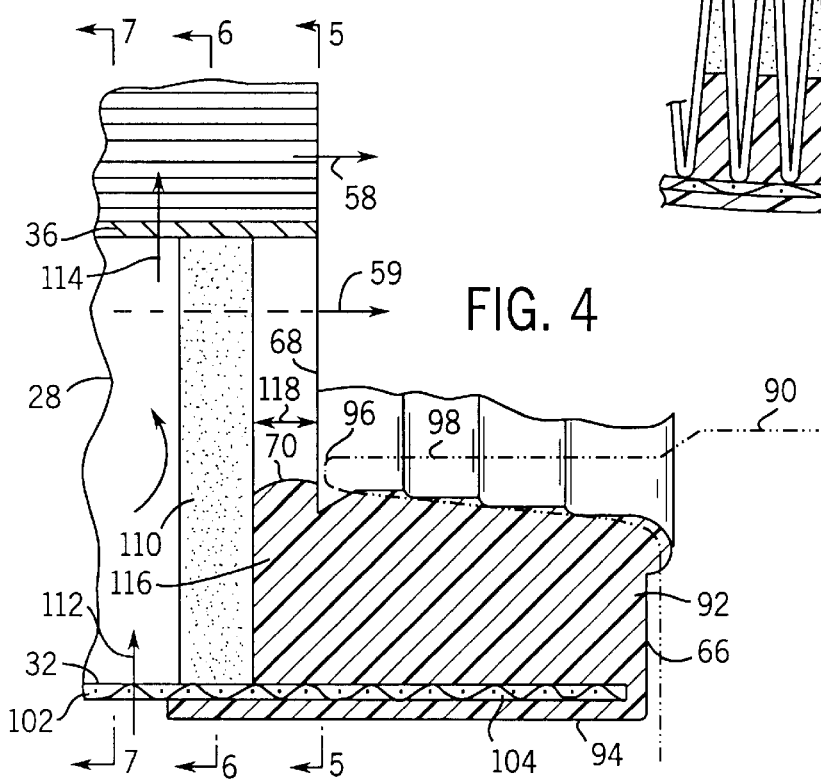
FIG. 4 is a sectional view taken along line 4—4 of FIG. 3.

End cap 66 has a sidewall 92, FIGS. 2 and 4, extending axially away axial ends 68 of pleats 28 at axial end 62 of filter element 22. The sidewall has an inner perimeter 70, as above noted, and an outer perimeter 94. As noted above, inner perimeter 70 of sidewall 92 is greater than inner perimeter 34 of filter element 22 defined by inner pleat tips 36. Inner perimeter 70 of sidewall 92 of end cap 66 is less than outer perimeter 30 of filter element 22 defined by outer pleat tips 32. Outer perimeter 94 of sidewall 92 of end cap 66 is greater than outer perimeter 30 of filter element 22 defined by outer pleat tips 32. Flow tube 90 has an inner section 96 axially facing the axial ends 68 of pleats 28. Inner section 96 of flow tube 90 has an inner perimeter 98 and an outer perimeter 100. Outer perimeter 100 is greater than inner perimeter 70 of sidewall 92 of end cap 66, such that as filter element 22 at end cap 66 is axially slid rightwardly over inner section 96 of flow tube 90, end cap 66 is radially compressed to expand inner perimeter 70 along outer sidewall 100 of flow tube inner section 96 to effect the noted radial seal. Inner perimeter 70 of end cap 66 is preferably stepped, as shown at steps 71, FIG. 8, to have slightly progressively decreasing diameters from right to left as viewed in FIGS. 8 and 2, to receive and guide inner section 96 of flow tube 90 therealong and increase radial sealing pressure. End cap 66 circumscribes inner section 96 of flow tube 90 and bears radially thereagainst in sealing relation to form the noted radial seal thereat. Endwall 88 of housing section 42 axially faces axial ends 68 of pleats 28, and end cap 66 also bears axially against endwall 88 in sealing relation to form the noted axial seal thereat.

An outer liner 102, FIGS. 2 and 4, provided by an expanded wire mesh or screen or perforated metal, circumscribes filter element 22 along outer pleat tips 32 and has an axial end section 104 extending axially beyond the axial ends 68 of pleats 28. As above described, flow tube 90 communicates with hollow interior 38 of the filter element along flow passage 56 and extends axially from the axial end of the filter element. End cap 66 at the axial end of the filter element bears radially between and is radially compressed between and against section 104 of outer liner 102 and inner section 96 of flow tube 90. Outer liner 102 extends axially at 104 into end cap 66 and is potted therein during the molding process, to be described. As noted above, sidewall 92 of end cap 66 extends axially away from the axial ends 68 of pleats 28 at the axial end of the filter element. Outer perimeter 94 of the end cap sidewall circumscribes outer liner section 104.

Figure 6:
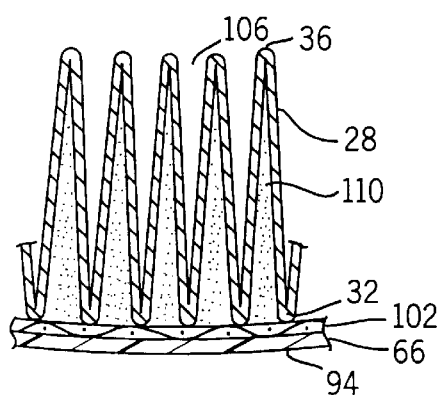
FIG. 6 is a sectional view taken along line 6—6 of FIG. 4
Figure 7:
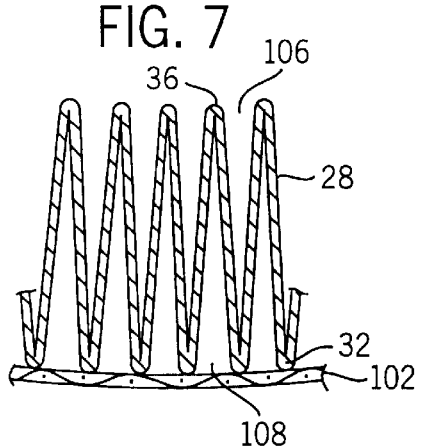
FIG. 7 is a sectional view taken along line 7—7 of FIG. 4.

Pleats 28 have pairs of walls defining axially extending interior channels 106, FIG. 7, and axially extending exterior channels 108. The walls of the pleats defining the exterior channels 108 are sealed to each other near axial end 62 of the filter element by heat seal bonding along glue strips such as 110, as known in the art, for example as disclosed in U.S. Pat. No. 5,106,397, incorporated herein by reference. This prevents bypass of dirty air around the axial ends of the pleats at inner exposed portions 74, FIGS. 8 and 9. Fluid such as air flowing radially inwardly through the filter media as shown at 112, FIG. 4, must flow through the sidewalls of pleats 28 before such fluid can flow axially as shown at arrows 58, 59. Some of such air can flow axially rightwardly in FIG. 4 as shown at arrow 59 axially along interior channels 106, and the balance of the air continues radially inwardly as shown at arrow 114 and then flows axially as shown at arrow 58. The axial ends of exterior channels 108 at the axial end of the filter element are blocked by the noted seal bonding along adhesive strips 110. Fluid flowing through the filter element is forced to pass from exterior channels 108 to interior channels 106. FIGS. 6 and 9 show the seal bonded adhesive 110 extending in exterior channels 108 all the way from inner pleat tips 36 to outer pleat tips 32 as idealized. If the seal bond does extend all the way from inner pleat tip 36 to outer pleat tip 32, then the shape of the interior channel 106 at outer pleat tip 32 will generally be more rounded and the walls of pleats 28 forming exterior channels 108 at outer pleat tips 32 will usually be closer together. In an alternative, the adhesive seal bond in exterior channels 108 may extend from inner pleat tips 36 only partially towards outer pleat tips 32, and the outer portions of exterior channels 108 are blocked at the axial end of the filter element by end cap 66. During the molding potting process, to be described, the liquid castable material into which the pleated filter media is dipped will foam up a short distance axially into the channels between the pleats, as shown at inner section 116, FIGS. 4, 8, 9, of the end cap which has migrated a distance 118, FIG. 4, between the pleats. The spacing of glue strips 110 on the pleats from the axial ends 68 of the pleats may be adjusted as desired in standard glue seal strip applicator machines. Preferably, glue seal strips 110 are spaced from axial ends 68 of the pleats by a small distance 118 to enable a slight deformation of the axial ends 68 of the pleats by a dam in the mold during the molding potting process, to keep the liquid castable material of the end cap from flowing radially inwardly onto inner portions 74 of the pleat ends which are desired to be exposed, which molding process and dam are to be described. Alternatively, seal glue strips 110 may be applied at axial ends 68 of the pleats, without gap 118 therebetween.

FIG. 11 shows a mold 120 for molding or potting end cap 66 onto pleated filter media 26 of the filter element. The mold has a trough 122 extending along an annular first perimeter and holding liquid castable material, such as urethane, therein into which axial ends 68 of pleats 28 are dipped. The mold has an insert 124 with an upstanding dam 126 extending along a second annular perimeter circumscribed by the noted annular perimeter of trough 122. Dam 126 engages axial ends 68 of the pleats between outer pleat tips 32 and inner pleat tips 36 and impedes flow of liquid castable material laterally radially inwardly towards inner pleat tips 36. Trough 122 partially spans axial ends 68 of the pleats such that the laterally outward portions 72 of the axial ends of the pleats are covered by the liquid castable material but not the laterally inward portions 74 of the pleats, such that laterally outward portions 72 of the axial ends of the pleats are covered by end cap 66, and laterally inward portions 74 of the axial ends of the pleats are uncovered by end cap 66 and are left exposed. It is preferred that the pleated filter media be dipped into the liquid castable material in the mold by lowering the pleated filter media downwardly until axial ends 68 of the pleats are engaged by dam 126, and then pushing the pleated filter media further slightly downwardly against the dam such that the dam slightly deforms axial ends 68 of the pleats at such engagement point which in turn pushes the pleat sidewalls forming the noted channels slightly laterally to further block the channels and further impede flow of liquid castable material laterally inwardly towards inner pleat tips 36. Trough 122 is bounded by an outer perimeter 126 and an inner perimeter 128. Outer perimeter 126 of trough 122 is greater than outer perimeter 30 of the filter element defined by outer pleat tips 32. Inner perimeter 128 of trough 122 is less than outer perimeter 30 of the filter element. Inner perimeter 128 of trough 122 is greater than inner perimeter 34 of the filter element defined by inner pleat tips 36. The noted second perimeter of the mold at annular dam 126 is less than or equal to inner perimeter 128 of trough 122.

As noted, the method for molding end cap 66 onto pleated filter media 26 involves dipping axial ends 68 of the pleats into liquid castable material in trough 122 of mold 120, and engaging axial ends 68 of the pleats against dam 126 at a location between outer pleat tips 32 and inner pleat tips 36 such that dam 126 impedes flow of the liquid castable material laterally inwardly towards inner pleat tips 36. Trough 122 is provided and aligned such that it partially spans axial ends 68 of the pleats such that the laterally outward portions 72 of the axial ends of the pleats are covered by the liquid castable material during dipping, but not the laterally inward portions 74 of the axial ends of the pleats. Further in accordance with the described method, laterally inward flow of the liquid castable material is impeded along the axial ends of the pleats toward inner pleat tips 36 by providing and aligning dam 126 to engage axial ends 68 of the pleats between outer pleat tips 32 and inner pleat tips 36, such that laterally outward portions 72 of the axial ends of the pleats are covered by end cap 66, and laterally inward portion 74 of the axial ends of the pleats are uncovered by end cap 66 and are left exposed. Trough 122 and filter element 22 are aligned during the noted dipping such that outer perimeter 126 of trough 122 circumscribes outer perimeter 30 of the filter element defined by outer pleat tips 32, and inner perimeter 128 of trough 122 circumscribes inner perimeter 26 of the filter element defined by inner pleats 36.

Figure 10:
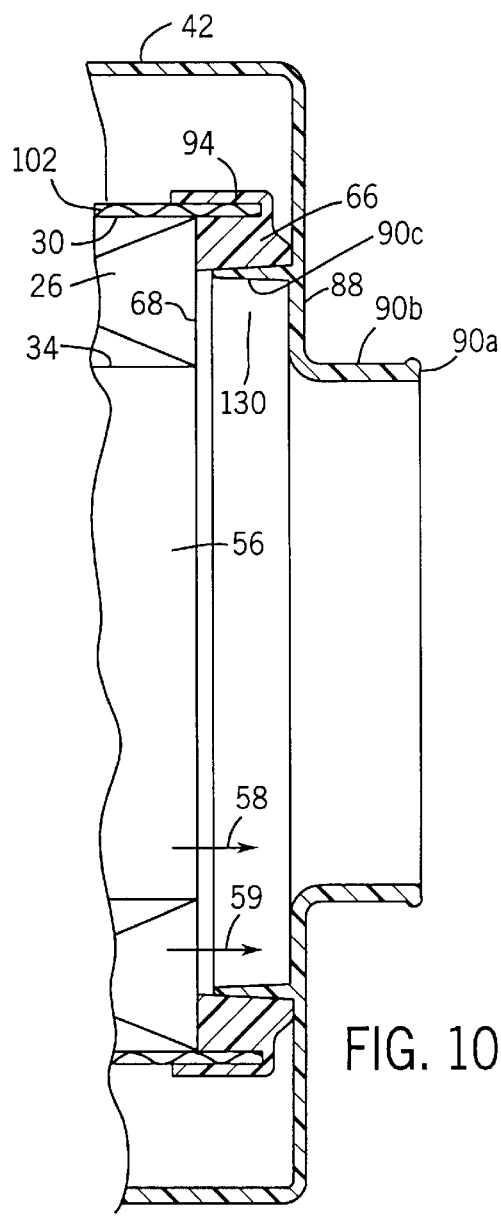
FIG. 10 is a view like a portion of FIG. 2, and shows an alternate embodiment.

FIG. 10 shows an alternate embodiment wherein outlet flow tube 90a has an outer section 90b of reduced diameter to accommodate engine compartment size and location requirements, yet maintaining an increased diameter inner section 90c maintaining the increased diameter and perimeter flow passage 56 including axial fluid flow at 58 and the extra axial fluid flow at 59, FIGS. 4 and 10. The spacing of axial endwall 88 of housing section 42 from axial ends 68 of the filter media pleats provides a plenum 130 accommodating the extra flow and reducing restriction.

The described filter construction was developed for air filters, though may be used for other fluids such as liquid. In the disclosed embodiment, fluid to be filtered flows laterally inwardly through the filter media from the outer perimeter to the inner perimeter and then flows axially in the hollow interior, such that flow passage 56 is an outlet flow passage. Alternatively, fluid to be filtered may flow axially in hollow interior 38 and then flow laterally outwardly through the filter media from the inner perimeter to the outer perimeter, in which case flow passage 56 is an inlet flow passage. In other alternatives, metal end caps are used instead of urethane end caps, or various combinations of materials are used for the end caps. In further embodiments, an inner liner may be added along inner pleat tips 36. In further alternatives, outer section 90b, FIG. 10, of the flow tube has a larger inner diameter than inner section 90c.

Present Invention

FIGS. 12–14 show the present invention, and use like reference numerals from above where appropriate to facilitate understanding.

FIG. 12 shows a filter element 202 for mounting in housing 24. Filter element 202 is provided by the noted pleated filter media 26 having a plurality of pleats 28 in a closed loop, typically an annulus, having an outer perimeter 30 defined by a plurality of outer pleat tips 32, and an inner perimeter 34 defined by a plurality of inner pleat tips 36. The annular closed loop has a hollow interior 38 extending along axis 40. Fluid to be filtered flows laterally or radially through filter media 26, and flows axially in hollow interior 38. The filter element has an axial flow passage 56a extending along axis 40 and circumscribing hollow interior 38 and having a flow perimeter as shown at diameter 204 greater than inner perimeter 34 as shown at diameter 206. Filter element 202 has first and second axial ends 62 and 64. First axial end 62 is open and provides the noted axial flow passage 56a therethrough. An end cap 208 of soft compressible resilient material, such as foamed potted urethane, is provided around outer pleat tips 32 at axial end 62 and has an outer perimeter 210 as shown at diameter 212 greater than the outer perimeter 30 of the outer pleat tips 32 as shown at diameter 204 and forming an outer sealing surface 214 external to axial flow passage 56a and engaging inner surface 43 of housing section 42 in radially compressed sealing relation. The axial end 216 of end cap 208 may or may not engage axial endwall 88 of housing section 42 in axially compressed or noncompressed relation. Sealing is accomplished by the radial seal provided by radial compression of end cap 208 between section 104 of outer liner 102 and inner facing surface 43 of the housing and/or the axial seal provided by axial compression of end cap 208 against axial endwall 88 of the housing. Section 104 of outer support liner 102 provides a support backing for compression of radial sealing of end cap 208 thereagainst, as above. Second end cap 76 is provided at second end 64 of the filter element and completely covers the axial ends of the pleats including the outer pleat tips and the inner pleat tips. As above, end cap 76 also includes central section 80 spanning and completely covering the hollow interior of the filter element and closing same.

Outer sealing surface 214 of end cap 208 at outer perimeter 210 faces away from axial flow passage 56a and radially outwardly relative to axis 40. End cap 208 has an inner perimeter 218 as shown at diameter 204 substantially equal to the outer perimeter 30 at outer pleat tips 32 as also shown at diameter 204. The outlet flow tube of the housing, shown at 90 in FIG. 2, is enlarged as shown at 90d in FIG. 12 to the noted diameter 204. This further increases and maximizes flow capacity, and further reduces and minimizes flow restriction. Fluid flows not only at arrows 58 and 59 as above, but also at arrow 59a through the laterally outward portions 72, FIGS. 8, 9, 4, of the axial ends of the pleats, axially through channels 106, FIGS. 6, 7.

End cap 208 encapsulates outer pleat tips 32 and outer support liner 102. End cap 208 has a major margin 220 extending radially outwardly away from outer support liner 102 to outer perimeter 210 of end cap 208. End cap 208 has a minor margin 222 extending radially inwardly from outer support liner 102 to the inner perimeter 218 of the end cap. Minor margin 222 encapsulates outer pleat tips 32. The radial or lateral extension of major margin 220 is substantially longer than the radial or lateral extension of minor margin 222. Inner perimeter 218 of end cap 208 is substantially equal to outer perimeter 30 at outer pleat tips 32, the difference being the length or radial extension of minor margin 222.

Inner perimeter 34 at inner pleat tips 36 defines and bounds a first cross-sectional area. Inner perimeter 218 of end cap 208 defines the flow perimeter as shown at diameter 204 of axial flow passage 56a. Inner perimeter 218 of end cap 208 defines and bounds a second cross-sectional area. Outer perimeter 30 at outer pleat tips 32 defines and bounds a third cross-sectional area. The difference between the noted first and second cross-sectional areas is substantially greater than the difference between the noted second and third cross-sectional areas.

As above, fluid to be filtered flows laterally inwardly through filter media 26 from outer perimeter 30 at outer pleat tips 32 to inner perimeter 34 at inner pleat tips 36 and then flows axially in hollow interior 38 and then out through flow passage 56a and housing outlet tube 90d. Flow passage 56a is thus an outlet flow passage. In an alternate embodiment, fluid to be filtered flows axially into the housing through flow tube 90d then axially along flow passage 56a into hollow interior 38 and then flows laterally outwardly through filter media 26 from inner perimeter 34 at inner pleat tips 36 to outer perimeter 30 at outer pleat tips 32. In this embodiment, flow passage 56a is an inlet flow passage. The present invention provides the axial flow as shown at arrow 58 in FIG. 4 and the axial flow as shown at arrow 59, and further provides additional axial flow as shown at arrow 59a in FIG. 12. The latter is due to the substantial removal of the radial extension of the end cap 208 from the axial ends 68 of the pleats in combination with moving the sealing function to outer periphery 210 and/or 216, FIG. 12, compared to the end cap of FIGS. 2 and 4 with inwardly facing radial sealing surface 70 and/or axial sealing surface 86, and end cap portion 116 covering the axial ends of the pleats and blocking otherwise available flow passage area. The extra flow enabled by the present invention at arrow 59a in FIG. 12 is in addition to the extra flow 59 provided by the parent invention. The present invention thus further increases and maximizes flow capacity, and further reduces and minimizes flow restriction.

FIG. 13 is similar to FIG. 11 and shows a mold 230 for molding or potting end cap 208 onto pleated filter media 26 of the filter element. The mold has a trough 232 extending along an annulus and holding liquid castable material, such as urethane, therein into which axial ends 68 of pleats 28 are dipped. Annular trough 232 has an outer perimeter 234 defining outer perimeter 210 of end cap 208, and an inner perimeter 236 defining inner perimeter 218 of end cap 208. It is preferred that there be a minimal gap 238 between inner perimeter 236 and outer support liner 102 of the filter element to encapsulate end section 104 of liner 102 and to encapsulate outer pleat tips 32 along their axial ends 68. It is preferred that gap 238 be kept to a minimum, such that inner perimeter 236 is substantially equal to perimeter 30. In other embodiments, the radial length of gap 238 is zero, i.e. there is no gap between inner perimeter 236 and outer liner 102. The mold has an insert 240 with an upstanding dam 242 extending along inner perimeter 236 and having an axial end engaging axial ends 68 of the pleats and impeding flow of liquid castable material laterally radially inwardly towards inner pleat tips 36. The pleated filter media is dipped into the liquid castable material in the mold by lowering the pleated filter media downwardly until axial ends 68 of the pleats are engaged by dam 242, and then pushing the pleated filter media further slightly downwardly against the dam such that the dam slightly deforms axial ends 68 of the pleats at such engagement point which in turn pushes the pleat sidewalls forming the noted channels slightly laterally to further block the channels and further impede flow of liquid castable material laterally inwardly towards inner pleat tips 36.

FIG. 14 is like FIG. 12 and shows another embodiment and uses like reference numerals where appropriate to facilitate understanding. Filter element 250 has an end cap 252 with a metal support extension member 254 embedded therein during the noted molding. The support extension member has a first leg 256 along outer support liner 102 at outer pleat tip 32, a second leg 258 extending radially outwardly from leg 256, and a third leg 260 providing a support backing for compression of sealing portion 262 of the end cap thereagainst. Sealing portion 262 is between leg 260 and outer sealing surface 264 and is spaced radially outwardly of outer pleat tips 32 by a radial gap 266 between legs 256 and 260. Leg 258 has first and second sides 268 and 270 facing axially in opposite directions and defining, in combination with legs 256 and 260, the noted radial gap 266. End cap 252 has a first portion 272 in radial gap 266, and a second portion 262 radially outwardly thereof and providing the noted sealing portion. Second side 270 of leg 258 faces an open radial gap 274 between outer pleat tips 32 and portion 262 of end cap 252. Open radial gap 274 is unfilled by the potting material of end cap 252. Legs 256, 258, 260 define a U-shaped support extension member 254, second leg 258 being the bight of the U, and first and third legs 256 and 260 extending axially and generally parallel to one another.

It is recognized that various equivalents, alternatives and modifications are possible within the scope of the appended claims.

What is claimed is:

1. A filter element comprising pleated filter media having a plurality of pleats in a closed loop having an outer perimeter defined by a plurality of outer pleat tips, and an inner perimeter defined by a plurality of inner pleat tips, said loop having a hollow interior extending along a given axis, wherein fluid flows axially in said hollow interior, said filter element having an axial flow passage extending along said axis and circumscribing said hollow interior and having a flow perimeter greater than said inner perimeter.

2. The invention according to claim 1 wherein said flow perimeter is less than said outer perimeter.

3. The invention according to claim 1 wherein said end inner perimeter defines and bounds a first cross-sectional area, said flow perimeter defines and bounds a second cross-sectional area, and wherein said second cross-sectional area is greater than said first cross-sectional area.

4. The invention according to claim 3 wherein said outer perimeter defines a third cross-sectional area, and wherein said second cross-sectional area is less than said third cross-sectional area.

5. The invention according to claim 1 wherein said filter element has first and second axial ends, said first axial end being open and providing said axial flow passage therethough, and comprising a first end cap at said first axial end axially abutting the axial ends of said pleats, said first end cap having an inner perimeter greater than said inner perimeter of said filter element defined by said inner pleat tips.

6. The invention according to claim 5 wherein said first end cap partially covers the axial ends of said pleats such that the laterally outward portions of said axial ends of said pleats are covered by said first end cap but not the laterally inward portions of said axial ends of said pleats, such that such laterally inward portions of said axial ends of said pleats are uncovered and exposed at said first axial end of said filter element.

7. The invention according to claim 6 said first end cap has a sidewall extending axially away from said axial ends of said pleats at said first axial end of said filter element, said sidewall having an inner perimeter and an outer perimeter, and wherein said inner perimeter of said sidewall of said first end cap is greater than said inner perimeter of said filter element defined by said inner pleat tips.

8. The invention according to claim 7 wherein said inner perimeter of said sidewall of said first end cap is less than said outer perimeter of said filter element defined by said outer pleat tips.

9. The invention according to claim 7 wherein said outer perimeter of said sidewall of said first end cap is greater than said outer perimeter of said filter element defined by said outer pleat tips.

10. The invention according to claim 7 comprising a flow tube having an inner section axially facing said axial ends of said pleats, said inner section of said flow tube having an inner perimeter and an outer perimeter, wherein said outer perimeter of said inner section of said flow tube is greater than said inner perimeter of said sidewall of said first end cap, and wherein said first end cap is composed of resilient compressible material.

11. The invention according to claim 6 comprising a flow tube having an inner section axially facing said axial ends of said pleats, and wherein said first end cap circumscribes said flow tube and bears radially thereagainst in sealing relation to form a radial seal thereat.

12. The invention according to claim 6 comprising a housing containing said filter element, said housing having an endwall axially facing said axial ends of said pleats, and wherein said first end cap bears axially against said endwall of said housing in sealing relation to form an axial seal thereat.

13. The invention according to claim 6 comprising a housing containing said filter element, said housing having an endwall axially facing said axial ends of said pleats, said endwall having a flow tube extending therethrough, said flow tube having an inner section axially facing said axial ends of said pleats, wherein said first end cap circumscribes said inner section of said flow tube and bears radially thereagainst in sealing relation to form a radial seal thereat, and wherein said first end cap bears axially against said endwall of said housing in sealing relation to form an axial seal thereat.

14. The invention according to claim 6 wherein said flow tube has an inner section and an outer section, said outer section having a smaller perimeter than said inner section, and wherein said endwall of said housing is axially spaced from said axial ends of said pleats and defines a plenum therebetween.

15. The invention according to claim 14 wherein said inner section of said flow tube has an inner perimeter and an outer perimeter, and said inner perimeter of said inner section of said flow tube is greater than said inner perimeter of said filter element defined by said inner pleat tips.

16. The invention according to claim 15 wherein said first end cap has a sidewall extending axially away from said axial ends of said pleats at said first axial end of said filter element, said sidewall having an inner perimeter and an outer perimeter, and wherein said inner perimeter of said sidewall of said first end cap is greater than said inner perimeter of said filter element defined by inner pleat tips, and said outer perimeter of said inner section of said flow tube is greater than said inner perimeter of said sidewall of said first end cap, and wherein said first end cap is composed of resilient compressible material.

17. The invention according to claim 1 wherein said closed loop is annular.

18. The invention according to claim 1 wherein said filter element has first and second axial ends, said first axial end being open and providing said axial flow passage therethrough, and comprising an end cap around said outer pleat tips at said first axial end and having an outer perimeter greater than said outer perimeter of said outer pleat tips and forming an outer sealing surface external to said axial flow passage.

19. The invention according to claim 18 wherein said outer sealing surface faces away from said axial flow passage and radially outwardly relative to said axis.

20. The invention according to claim 18 wherein said end cap has an inner perimeter substantially equal to said outer perimeter of said outer pleat tips.

21. The invention according to claim 18 comprising an outer support liner around said filter element at said outer pleat tips, and wherein said end cap encapsulates said outer pleat tips and said outer support liner, said end cap having a major margin extending radially outwardly away from said outer support liner to said outer perimeter of said end cap.

22. The invention according to claim 21 wherein said end cap has a minor margin extending radially inwardly from said outer support liner to the inner perimeter of said end cap, said minor margin encapsulating said outer pleat tips.

23. The invention according to claim 22 wherein the radial extension of said major margin is longer than the radial extension of said minor margin.

24. The invention according to claim 23 wherein the radial extension of said major margin is substantially longer than the radial extension of said minor margin, and wherein said inner perimeter of said end cap is substantially equal to said outer perimeter of said outer pleat tips, the difference being the length of said radial extension of said minor margin.

25. The invention according to claim 18 wherein said inner perimeter of said inner pleat tips defines and bounds a first cross-sectional area, said end cap has an inner perimeter defining said flow perimeter, said inner perimeter of said end cap defines and bounds a second cross-sectional area, said outer perimeter of said outer pleat tips defines and bounds a third cross-sectional area, and wherein the difference between said first and second cross-sectional areas is substantially greater than the difference between said second and third cross-sectional areas.

26. The invention according to claim 18 comprising a support extension member in said end cap, said support extension member having a first leg at said outer pleat tips, a second leg extending radially outwardly from said first leg, and a third leg at the outer end of said second leg, said third leg providing a support backing for compression of a sealing portion of said end cap thereagainst, said sealing portion being between said third leg and said outer sealing surface and spaced radially outwardly of said outer pleat tips by a radial gap between said first and third legs.

27. The invention according to claim 26 wherein said second leg has first and second sides facing axially in opposite directions and defining, in combination with said first and third legs, said radial gap, and wherein said end cap has a portion in said radial gap, and a second portion radially outwardly thereof and providing said sealing portion.

28. The invention according to claim 27 wherein said second side of said second leg faces an open radial gap between said outer pleat tips and said second portion of said end cap, said open radial gap being unfilled by said end cap.

29. The invention according to claim 26 wherein said first, second and third legs define a U-shaped said support extension member, said second leg being the bight of the U, said first and third legs extending axially and generally parallel to one another.

30. A filter element comprising pleated filter media having a plurality of pleats in a closed loop having an outer perimeter defined by a plurality of outer pleat tips, and an inner perimeter defined by a plurality of inner pleat tips, said loop having a hollow interior extending along a given axis, wherein fluid flows axially in said hollow interior, said filter element having an axial flow passage extending along said axis, said filter element having first and second axial ends, said first axial end being open and providing said axial flow passage therethrough, an outer liner circumscribing said filter element along said outer pleat tips and extending beyond said pleats, a flow tube communicating with said hollow interior along said flow passage and extending axially from said first axial end of said filter element, an end cap of resilient compressible material at said first axial end of said filter element and bearing radially between and radially compressed between said outer liner and said flow tube.

31. The invention according to claim 30 wherein said outer liner extends axially into said first end cap.

32. The invention according to claim 31 wherein said first end cap has a sidewall extending axially away from the axial ends of said pleats at said first axial end of said filter element, said sidewall having an inner perimeter and an outer perimeter, said outer perimeter of said sidewall of said first end cap circumscribing said outer liner.

33. The invention according to claim 32 wherein said inner perimeter of said sidewall of said first end cap is greater than said inner perimeter of said filter element defined by said inner pleat tips.

34. The invention according to claim 30 wherein said first end cap has a sidewall extending axially away from the axial ends of said pleats at said first axial end of said filter element, said sidewall having an inner perimeter and an outer perimeter, wherein said inner perimeter of said sidewall of said first end cap is greater than said inner perimeter of said filter element defined by said inner pleat tips.

* * * * *